April 30, 1940.  W. FEINBLOOM  2,198,863

CONTACT LENS

Original Filed June 30, 1937

WILLIAM FEINBLOOM
INVENTOR.

BY
ATTORNEYS

Patented Apr. 30, 1940

2,198,868

UNITED STATES PATENT OFFICE 2,198,868

CONTACT LENS

William Feinbloom, New York, N. Y.

Application June 30, 1937, Serial No. 151,196
Renewed February 23, 1940

2 Claims. (Cl. 88—54.5)

This application is a continuation in part of my application Serial No. 97,310 filed August 22, 1936, for Telescopic contact lens.

The present invention relates to contact lenses and more particularly to contact lenses having compound optical systems such as telescopes.

The use of spectacles having compound optical systems for the improvement of subnormal vision have long been known but such spectacles have presented certain insurmountable difficulties. They are unsightly to wear, have a small field of view, and are difficult to correct for oblique bundles of rays. These difficulties can be largely overcome by mounting the compound lens system in a contact lens.

One of the objects of the present invention is to provide a contact lens having a corneal section comprising a compound optical system. Another object is to provide a contact lens having a compound corneal section and a moldable scleral rim. A further object is to provide a telescopic contact lens. These and other objects and advantages reside in certain novel features of construction, arrangement and combination of parts, as will hereinafter be more fully set forth and pointed out in the appended claims.

Referring to the drawing.

The constructional examples disclosed in this application are telescopic systems, that is, compound systems in which the focal planes of the two lenses or refracting surfaces coincide. However, it is to be understood that the invention comprehends other optical systems in which the object distance is finite and the computation and design of the optics of these latter systems are well known. The lens system of this invention is essentially magnifying or minifying rather than merely corrective and the compound system is modified to include any corrective factor.

Figure 1:
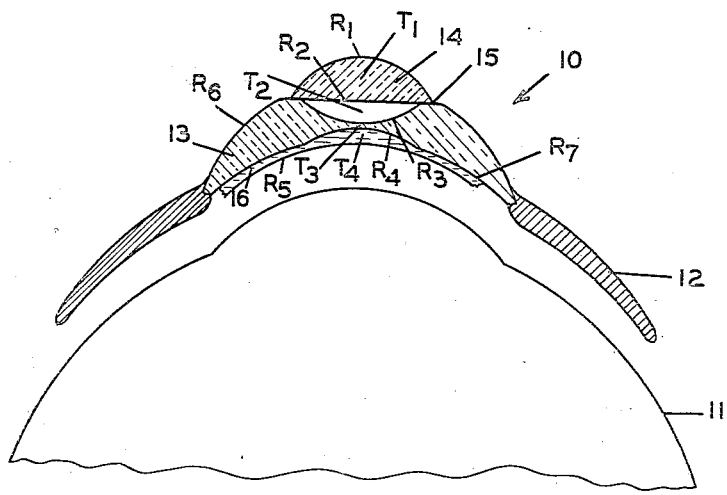
Fig. 1 is an axial section of a telescopic contact lens embodying the present invention.

In the embodiment shown in Fig. 1, 10 designates, generally, the central corneal portion which is held on an eye 11 by a scleral rim 12. In the interests of clearness, the eye is shown as spaced from the contact lens but it is to be understood that the two are in the usual intimate contact.

The central corneal portion 10 consists of a glass body member 13, the outer edge of which is secured to the scleral rim 12. The central portion of the body member 13 is biconcave and a positive lens 14 is secured by cementing or the like on a shoulder 15 located on the front surface of the body member 13 surrounding the biconcave portion. The usual physiological saline solution 16 is between the eye 11 and the body member 13.

The biconcave portion of the body member 13, the positive lens 14 and the saline solution 16 form a Galilean telescope. Assuming a corneal curvature of 7.60 mm., a constructional example, giving a magnification of approximately 1.5, would have the following constants:

|  |  |  | Nd | Thickness |  |
|---|---|---|---|---|---|
| Lens 14 | $R_1$ | 3.40 | 1.5170 | $T_1$ 1.7 |  |
|  | $R_2$ | plano |  | $T_2$ 0.9 |  |
| Lens 13 | $R_3$ | 3.93 | 1.5170 | $T_3$ 0.2 |  |
|  | $R_4$ | 4.00 |  |  |  |
| Fluid lens 16 | $R_5$ | 7.60 | 1.3333 | $T_4$ 0.55 |  |
|  | $R_6$ | 8.50 |  |  |  |
|  | $R_7$ | 6.50 |  |  |  |

This example is for an eye having the average corneal curvature of 7.60 mm. and the necessary changes for other corneal curvatures would be obvious to those skilled in the art. The curvature of the rear surface $R_5$ of the fluid lens 16 will always be the curvature of the cornea since it is the cornea which forms this surface. The surfaces $R_6$ and $R_7$ have no optical effect and are given merely to make the example complete.

It is also understood that, by proper alterations of one or more of the surfaces of the elements 13 and 14 of the telescope, refractive errors such as nearsightedness, farsightedness or astigmatism can be corrected. The manner of making these corrections will be apparent to those skilled in the art.

Figure 2:
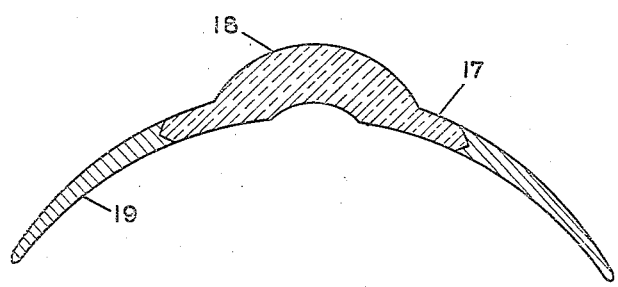
Fig. 2 is an axial section of another form of contact lens.

Fig. 2 illustrates a simplified form of telescopic contact lens in which a separate positive objective is omitted. In this form the corneal portion 17 has a central meniscus portion 18 which, together with the saline fluid not shown, acts as a telescope. The corneal portion 17 is held on the eye by a scleral rim 19 in the same manner as the corneal portion 10 of Fig. 1.

It will be noted that the telescope of my invention is only one part of the corneal section which itself is mounted on, or forms part of, the scleral rim. Although the invention is not limited thereto, it is preferred that this scleral rim be made of a moldable plastic material such as a synthetic resin, so that the shape of the scleral rim can be readily worked independently. The scleral rim may be made from a mold taken from an impression of the eye or it may be made to duplicate the curvature of a well-fitting contact test lens. Of course, the scleral rim may also be of glass or the like, but the moldable plastic rim is preferred.

While the invention is described with reference to a telescopic contact glass, it is obvious that the optical system could be of the microscope type and could be either magnifying or minifying. The real essence of the invention is the provision of a contact glass having a compound optical system so that the optical system moves with the eye and the line of sight is always substantially coincident with the optical axis. The telescope system is described merely as an example and other applications of the invention will be apparent to those skilled in the art.

I claim:

1. A telescopic contact lens comprising a corneal part and a scleral rim for holding said corneal part before an eye, said corneal part comprising a glass body member having a negative central area, a positive lens carried on the front of said body member in axially spaced alignment with said negative area, and means for retaining a fluid between the body member and the eye, the positive lens, the negative area of the body member, and the fluid lens between the eye and the body member combining to form a Galilean telescope.

2. A telescopic contact lens comprising a scleral rim portion adapted to rest on the eyeball beneath the lids and a corneal glass section sufficiently thin to permit closing of the lids secured thereto, said corneal glass section having at its optic axis, a negative ocular lens of predetermined index of refraction, and a superposed positive objective lens of different predetermined index of refraction, said lenses being so constructed and arranged that there exists an air space between the adjacent surfaces thereof.

WILLIAM FEINBLOOM.